US006677834B1

(12) United States Patent
Rafalczik et al.

(10) Patent No.: US 6,677,834 B1
(45) Date of Patent: Jan. 13, 2004

(54) FILTERING DEVICE FOR FILTERING OUT SUPPLY VOLTAGE INTERFERENCES

(75) Inventors: Achim Rafalczik, Nordstemmen (DE); Uwe Dombrowsky, Sibbesse (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/807,481

(22) PCT Filed: Jul. 10, 1999

(86) PCT No.: PCT/DE99/02138

§ 371 (c)(1), (2), (4) Date: Jul. 9, 2001

(87) PCT Pub. No.: WO00/22721

PCT Pub. Date: Apr. 20, 2000

(30) Foreign Application Priority Data

Oct. 13, 1998 (DE) ........................................ 198 47 014

(51) Int. Cl.[7] ........................... H03H 5/12; H02M 1/15

(52) U.S. Cl. ....................................... 333/181; 333/174

(58) Field of Search ................................ 333/172, 174, 333/181, 175

(56) References Cited

U.S. PATENT DOCUMENTS

| | | | | |
|---|---|---|---|---|
| 2,936,426 A | * | 5/1960 | McClean | 333/172 X |
| 5,155,648 A | | 10/1992 | Gauthier | 361/58 |
| 5,539,299 A | * | 7/1996 | Fernandez et al. | 320/163 |
| 5,781,082 A | | 7/1998 | Gunji et al. | 333/172 |

FOREIGN PATENT DOCUMENTS

| | | | | |
|---|---|---|---|---|
| FR | 2 678 772 | | 1/1993 | |
| JP | 08088528 A | * | 4/1996 | H03H/7/06 |
| JP | 10201234 | | 7/1998 | |

* cited by examiner

*Primary Examiner*—Robert Pascal
*Assistant Examiner*—Dean Takaoka
(74) *Attorney, Agent, or Firm*—Kenyon & Kenyon

(57) ABSTRACT

A filtering device for filtering out a supply voltage interference of a voltage source that delivers a supply voltage for an electrical load, in which the filtering device includes a capacitor that establishes a connection between the voltage source and the load to a reference potential, and in which a diode is connected between the voltage source and the capacitor, to which a variable resistor is connected in parallel.

10 Claims, 2 Drawing Sheets

14
18
20
10
16
26
22
100
12
24
24

FILTERING DEVICE FOR FILTERING OUT SUPPLY VOLTAGE INTERFERENCES

FIELD OF THE INVENTION

The present invention relates to a filtering device and method for filtering out supply voltage interference of a voltage source which delivers a supply voltage for an electrical load, having a capacitor which establishes a connection between the voltage source and the load to a reference potential.

BACKGROUND INFORMATION

A filtering element having a coil and a capacitor and referred to as an LC filter may be used for suppressing line-conducted system interference. It should ensure that no interference, for example, of a motor vehicle generator or another vehicle component can be heard in an audio signal of a car radio, for example. In order to protect a load to be connected from damage due to accidental polarity reversal, a power diode may also be provided for tripping a fuse in the event of polarity reversal.

The aforementioned LC filter is, however, an oscillating system whose resonance frequency is in the range of a bass frequency of audio reproduction. In the event of resonance, the energy stored in the capacitor's coil is moved back and forth between these two components and thus may not be transmitted to the load, i.e., an LF power output stage of a car radio or a stereo system, for example. As a result, the output stages of car radios, for example, may not be supplied with sufficient bass frequency current, resulting in an increased distortion factor in the bass range, which is referred to as "bass bulge."

It is believed that another disadvantage of the use of such an LC filter is that the effect of the coil in the case of high load currents, i.e., in the case of a high audio output power of a car radio as a load, for example, may diminish considerably, so that in this case only an ohmic resistance and a highly reduced reactance of the coil remain effective. In this case, an AC current load on the capacitor and thus its power loss may become excessive, resulting in accelerated aging of the capacitor. The magnitude of the load depends on the distribution of the current flowing through the coil resistance and the internal resistance of the capacitor. Accordingly, if the internal resistance of the coil is low, the load on the capacitor is similarly low.

SUMMARY OF THE INVENTION

An object of an exemplary embodiment and/or exemplary method of the present invention is to provide an improved filtering device of the above-named type and a corresponding method for operating it, which would eliminate the above-named disadvantages and achieve improved filtering of interference while affecting the load as little as possible.

It is believed that this objective may be achieved with a filtering device of the above-named type, in which a diode is connected between the voltage source and the capacitor, and to which a variable resistor is connected in parallel.

It is believed that this has the advantage that a coil-less filter is made available, which eliminates the disadvantages introduced by the coil in the systems referred to above, while its operation is not affected and is therefore improved, since there is no oscillating system.

An aspect of an exemplary embodiment of the present invention is that the coil is replaced in the filtering element by a diode, which is bridged by a controlled resistor in the event of high load currents. At the same time, the polarity reversal protection diode may be omitted, so that, in the event of accidental polarity reversal when the load is connected, the fuse is not destroyed. Since the circuit according to the exemplary embodiment of the present invention is not an oscillating system, it is believed that all disadvantages associated with such systems may be eliminated, since there is no more resonance or bass bulge.

Since the capacitor cannot be discharged via the power supply or the vehicle electrical system, which may occur in the case of an LC filter, it is believed that the undesirable phenomena associated therewith such as clicking noise due to an audio output stage may be avoided.

In an exemplary embodiment, the variable resistor is an electrically controllable resistor, the diode and the resistor being arranged as a MOSFET transistor connected between the voltage source and the capacitor, which is provided with a control circuit for controlling the variable resistor.

In order to ensure sufficient power supply to the load in the event of high power demand, the control circuit for deriving a control signal for the variable resistor is connected to a power output of the load, for example.

The voltage source may be a motor vehicle electrical system and the load may be an automotive audio component, a car radio in particular. The reference potential may be a ground potential, for example.

In operating the exemplary filtering device according to the exemplary embodiment of the present invention, the resistance of the variable resistor is reduced as the power consumption of the load increases.

DETAILED DESCRIPTION

Figure 1:
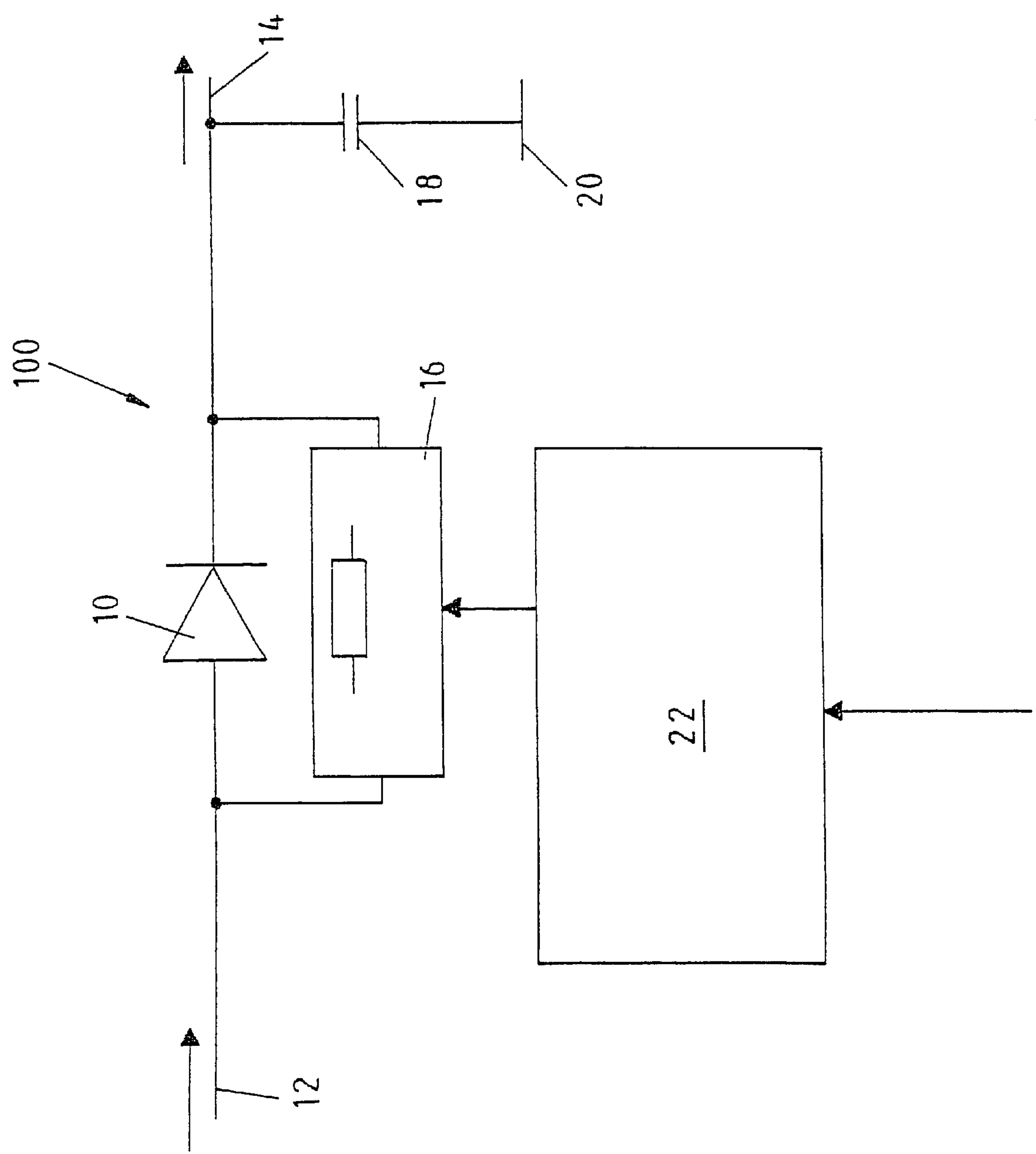
FIG. 1 shows an exemplary embodiment of a filtering device according to the present invention.

According to the schematic block diagram of FIG. 1, a filtering device 100 according to an exemplary embodiment of the present invention includes a diode 10, which is connected between a terminal 12 of a voltage supply (not shown) and a terminal 14 of a load (not shown), a variable resistor 16, which is electronically controllable in particular, connected in parallel to diode 10, and a capacitor 18, which connects diode 10 and terminal 14 on the load to a reference potential 20, such as ground potential.

A control circuit 22 is provided to set a resistance value of variable resistor 16. Control circuit 22 derives an appropriate control signal for setting the resistance value of variable resistor 16 from a signal output of the load. If the load is a car radio, for example, the control circuit may be connected to an audio output of an LF output stage of the car radio. In the event of high load currents, which corresponds to a high LF level, for example, diode 10 is bridged by variable resistor 16 due to a corresponding reduction in the resistance of variable resistor 16. The resistance of variable resistor 16 is reduced so that it is lower than the resistance of a coil that would otherwise be used. This reduces the AC current load and thus the power loss of capacitor 18. Due to the low voltage drop across the bridge resistor, a higher voltage is available to the load, for example, to the audio output stages of a car radio, so that an output power of the load is higher compared with an arrangement having LC filters under conditions that are otherwise comparable, such as system voltage, LF total harmonic distortion, etc. In addition, by replacing the large coil with a relatively small diode the dimensions of the filtering device are reduced, which is an increasingly important factor for the compactness of today's car radios and other automotive components, for example.

As long as only diode 10 is active in operation, load capacitor 18 is charged to the maximum value of the supply voltage affected by the interference in the case of supply voltage interference. The ripple content of the capacitor voltage is determined only by the current consumption of the load. As soon as an output power of the load, e.g., the LF output power of a radio, becomes maximum, diode 10 is bridged by variable resistor 16, so that no voltage drop takes place across the diode, which would limit the control range.

Figure 2:
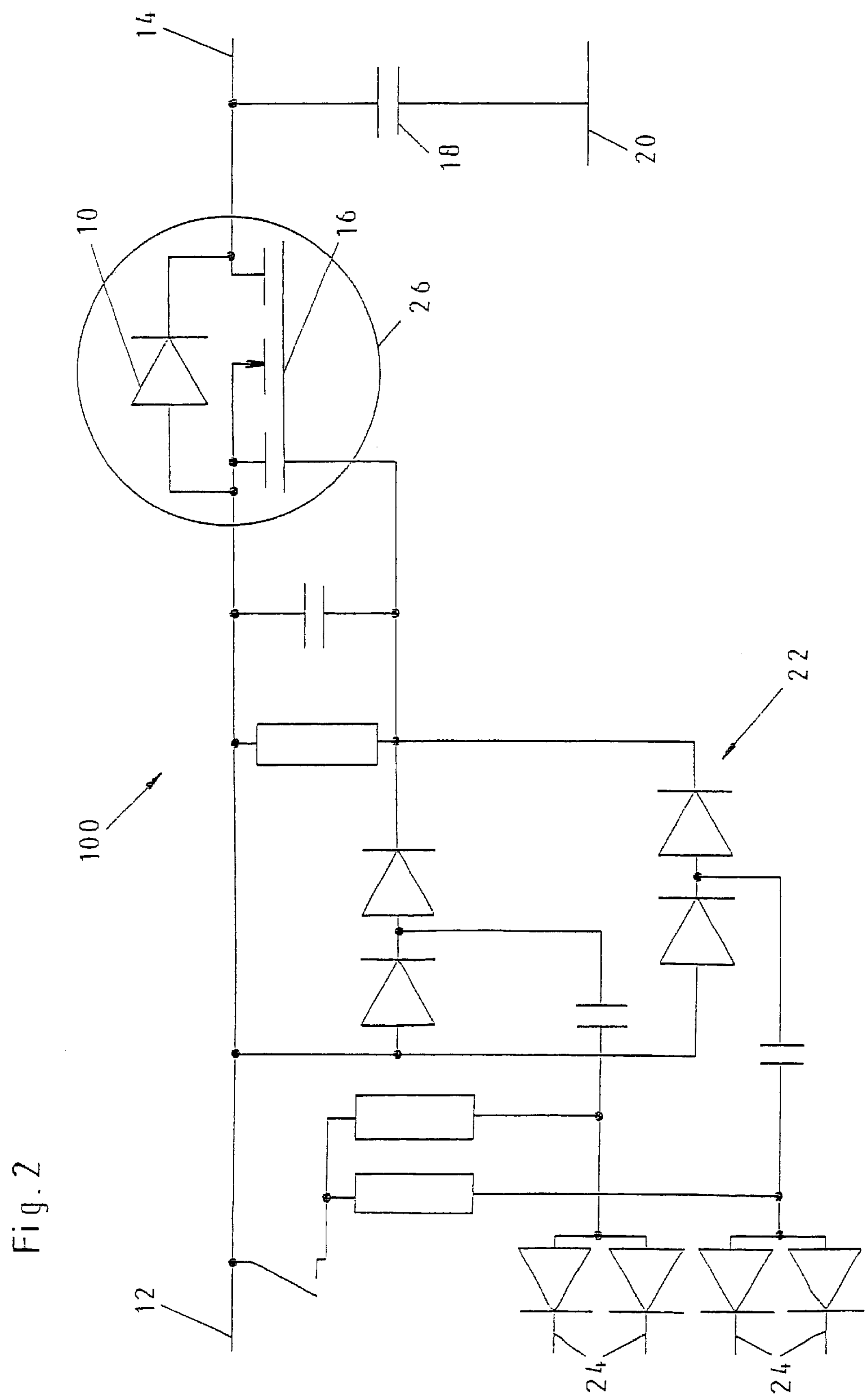
FIG. 2 shows an exemplary circuit of an exemplary embodiment of a filtering device according to the present invention.

Since in the case of automotive audio components such as radios or boosters, a relatively low quiescent current flows, which increases with increasing LF power, in an exemplary embodiment of a filter device according to an exemplary embodiment of the present invention, the resistance of variable resistor 16 is directly gated with an LF output signal, as illustrated in FIG. 2. Here the combination composed of diode 10 and variable resistor 16 is implemented by a power MOSFET transistor 26. Such a MOSFET transistor 26 already contains a power diode 10, so that both elements, diode 10 and variable resistor 16, are combined in a single housing. The device is controlled via a charge pump, which generates a required control voltage as a function of an output power directly from the audio signal at audio outputs 24.

As an alternative, variable resistor 16 is controlled as a function of other control quantities derived from the audio signal.

What is claimed is:

1. A filtering device comprising:

a capacitor for establishing a connection between a voltage source and a load to a reference potential, the voltage source delivering a supply voltage for an electrical load;

a diode connected between the voltage source and the capacitor; and a variable resistor connected in parallel to the diode, the variable resistor being controllable as a function of a power consumption of the load.

2. The filtering device of claim 1, wherein the variable resistor is controllable so that a resistance of the variable resistor decreases as the power consumption of the load increases.

3. The filtering device of claim 1, wherein the variable resistor is controllable by a control circuit.

4. The filtering device of claim 3, wherein the control circuit is operable for deriving a control signal for the variable resistor, and the control circuit is coupled to a power output of the load.

5. The filtering device of claim 1, wherein the voltage source is a motor vehicle electrical system and the load is at least one of an automotive audio component and a car radio.

6. The filtering device of claim 5, wherein the control circuit is operable for deriving a control signal for the variable resistor, and the control circuit is connected to an audio output of an LF output stage of the load.

7. The filtering device of claim 1, wherein the reference potential is a ground.

8. The filtering device of claim 1, wherein the diode and the variable resistor are provided by a MOSFET transistor connected between the voltage source and the capacitor.

9. The filtering device of claim 1, wherein the filtering device is for filtering out a supply voltage interference in the supply voltage deliverable to the load, the voltage source generating the supply voltage interference.

10. A method of operating a filtering device, the filtering device including a capacitor for establishing a connection between a voltage source and a load to a reference potential, the voltage source delivering a supply voltage for an electrical load, a diode connected between the voltage source and the capacitor, and a variable resistor connected in parallel to the diode, the method comprising the step of:

controlling the variable resistor as a function of a power consumption of the load, a resistance of the variable resistor decreasing as a power consumption of the load increases.

* * * * *